HIGH POWER SWITCH TUBE

Filed June 8, 1959 2 Sheets-Sheet 1

Inventors:
Gilbert H. Reiling;
James M. Lafferty,
by John F. Ahern
Their Attorney.

Inventors:
Gilbert H. Reiling;
James M. Lafferty,
by John F. Ahern
Their Attorney.

3,049,639
HIGH POWER SWITCH TUBE

Gilbert H. Reiling and James M. Lafferty, Schenectady, N.Y., assignors to General Electric Company, a corporation of New York Filed June 8, 1959, Ser. No. 818,747
10 Claims. (Cl. 313—166)

Figures 1, 2, 3, 5:
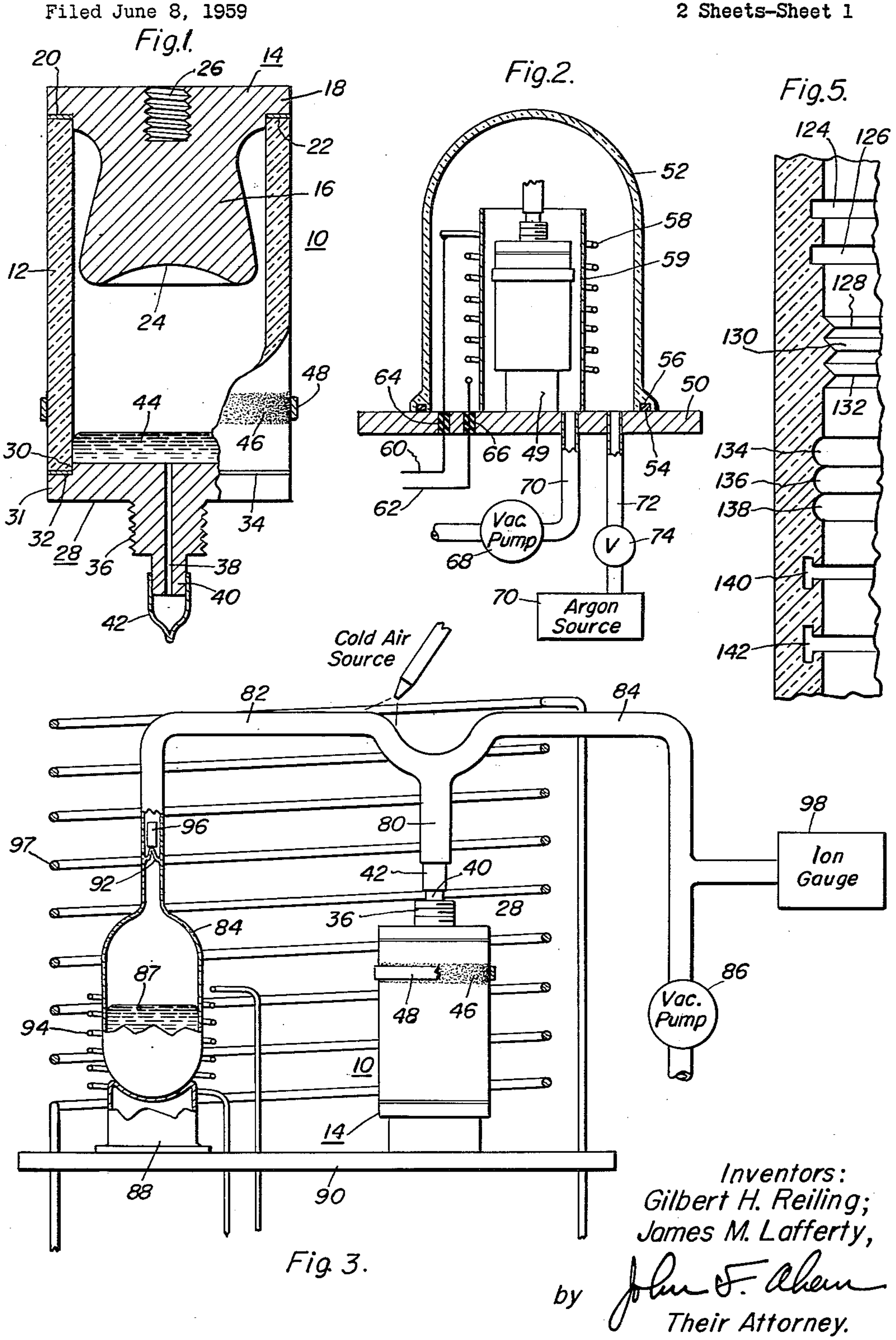

This invention relates to an electron discharge device and more particularly relates to a high power electronic switch tube for controlling the flow of intense electrical currents. This application is a continuation-in-part of our copending application Serial No. 796,505, filed March 2, 1959, now abandoned.

In the operation of certain electronic apparatus it is necessary to apply very large values of electrical current to certain types of electrical loads. Such large currents are frequently advantageously achieved by the simultaneous connection in parallel of a large number of banks of charged capacitors and the further simultaneous connection of these parallel connected capacitors to the load through which such large current is passed. For maximum effect and efficiency, it is necessary that the several banks of capacitors be connected in parallel with each other and across the load in question at substantially the same instant of time or under certain circumstances, at precisely measured periods of delay. Very slight differences in the instant of application are permissible without adverse effects, however, it is important in many cases that such periods of variation be less than one tenth of a microsecond. Mechanical switches, although being capable of accommodating the large currents under consideration, are unacceptable for most purposes in that it is exceedingly difficult, if not impossible, to obtain a simultaneous closing of mechanical switches in periods of time less than one tenth of a microsecond. Electronic switching techniques for obtaining accurate and precise control are known. However, according to prior arrangements, none are adaptable for accommodating the very large currents of the order of 35,000 amperes or more, under consideration.

Previously, attempts have been made to achieve the desired rapid switching of very large currents. These attempts utilized conventional ignitron rectifiers of the type having a carbon or steel anode spaced from a mercury pool cathode contained in a conductive housing. These devices utilized an ignitor comprising a rod extending into the mercury pool and responsive to a suitable potential applied between the ignitor and cathode to initiate mercury ionization in the tube and heavy current conduction between anode and cathode. In the use of such tubes, a high potential of the order of 20 kilovolts to 30 kilovolts is applied between cathode and anode and the precise instant of conduction may be controlled by precisely controlling the application of the igniting potential to the ignitor.

While these types of devices are of great utility for many uses, it is desirable that devices and systems be provided for precisely controlling extremely high currents and impose relatively low impedance to such currents. These currents are produced by high potentials applied across the tube electrodes and it is important for proper control, that the tube be capable of retaining these high potentials across the tube electrodes for relatively long periods without spontaneous conduction within the tube. In achieving these characteristics, it is necessary that the tube interior be free of all ionizable gases including occluded gases, since these gases may be released and ionized to cause spontaneous conduction in the tube during operation, particularly when the tube parts are heated. To minimize inductance effects, relatively small tube dimensions are desirable. It is also desirable that the tube be capable of repeated use without damage or destruction of any component parts thereof, such as the starter mechanism since such starter mechanism must necessarily initiate conduction in the tube many times. Thus, provision to maintain the tube electrodes insulated from each other and free from conductive deposit created by anode sputtering or otherwise, is necessary, and the starter must not be subjected to the adverse effects of the high current conduction in the tube. Condensation of mercury in any location other than the mercury pool cathode should be avoided.

Accordingly, it is a principal object of our invention to accurately and precisely control the initiation of the flow of very large currents to a load circuit at instants of time predetermined to less than one tenth of a microsecond.

It is another object of our invention to accurately and precisely control the simultaneous closing of a plurality of electronic switches accommodating very large currents.

It is another object of our invention to enable the repeated use of an electronic switch device for controlling very high currents without destruction or breakdown thereof.

It is another object of our invention to facilitate the "hold-off" or maintenance of a high potential across the terminals of a high power switch device without spontaneous conduction thereof.

It is another object of our invention to provide a high power electronic switch device that possesses relatively low inductance and thus imposes low inductive reactance to currents passing therethrough.

It is another object of our invention to provide a high power electronic switch device capable of repeated conduction at currents to 100,000 amperes and of retaining voltages to 30,000 volts or more across electrodes of the device.

It is another object of our invention to maintain the electrodes of a high power electronic switch device insulated from each other in the nonconducting state thereof.

It is another object of our invention to minimize anode sputtering in a high power electronic switch device and to minimize the effects of sputtering that does occur.

It is another object of our invention to prevent the condensation and accumulation of mercury at locations other than the mercury pool cathode in a high power electronic switch device.

In accordance with features of our present invention, a high power switching device is produced wherein a hollow, evacuable body comprises the housing portion of the tube and accommodates a refractory metallic anode inserted well into the body at one end and a mercury pool cathode is supported within the other end by a metallic cathode support. In one preferred embodiment of the invention the anode and cathode support member are of titanium and the tube envelope is of a titanium-matching ceramic. As a particular feature of our invention, in the final stage of preparation of the tube, it is heated to a temperature at which the tube parts are all thoroughly outgassed and the tube parts are made of materials capable of withstanding the temperatures involved. To prevent undesirable gases from re-entering the tube interior, a tubulation leading to the tube interior is joined to a source of pure mercury which is distilled into the tube after the out-gassing thereof is completed.

As another feature of our invention, ignition in the ceramic embodiment of the switch is achieved with an ignitor formed as a conductive band about the ceramic body in the vicinity of the mercury pool cathode. To ignite the tube and initiate conduction therein, a potential is applied between the ignitor band and the mercury pool, of such intensity to produce conduction from the band to the pool through the ceramic body. Thus, the ignitor is completely removed from the arc discharge and not at all subject to destruction in the manner of conventional ignitron ignitors. The titanium anode and the cathode holder perform as gettering elements to absorb any minute quantities of gases not exhausted during the sealing operation of tube construction. For preventing accumulation of mercury between the anode and ceramic envelope wall, the anode is undercut along a portion to widen the spacing therebetween to allow the mercury to fall.

Figure 4:
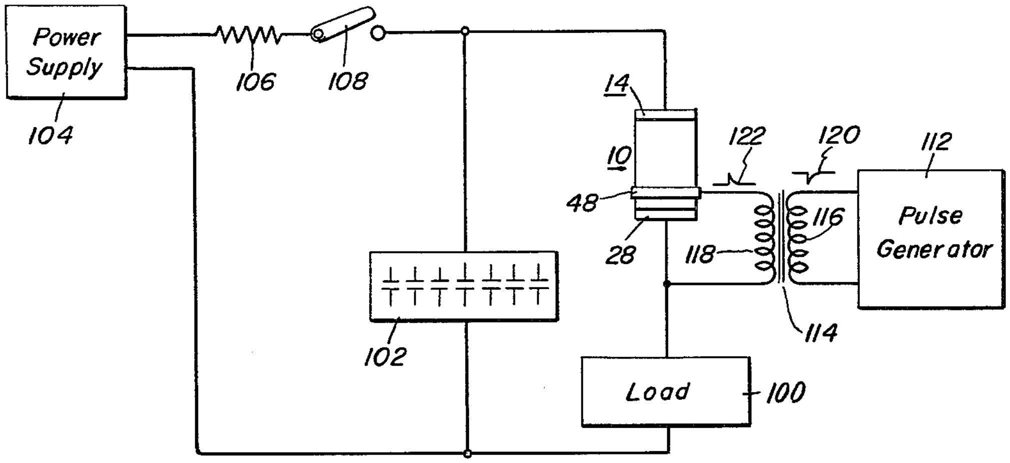
Figure 9:
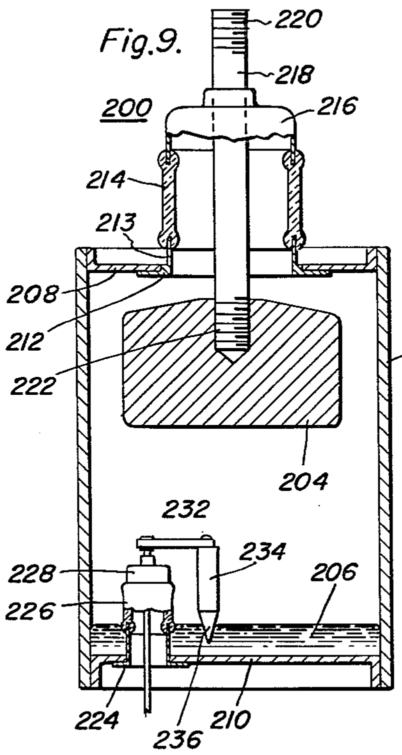
Figure 6:
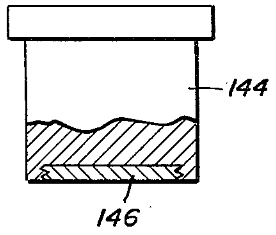
Figure 7:
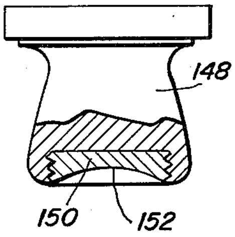
Figures 8, 10:
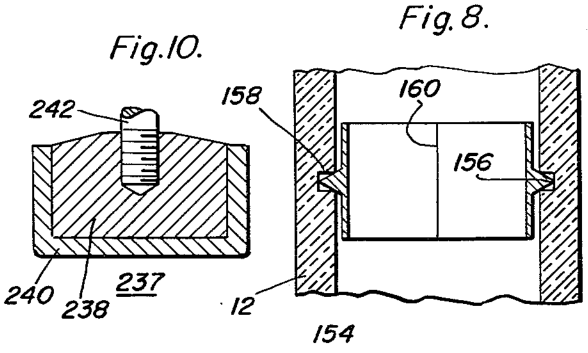

The novel features believed characteristic of this invention are set forth in the appended claims. The invention itself together with further objects and advantages thereof may best be understood with reference to the accompanying drawings in which:

FIG. 1 is a partially cut-away elevation showing the details of a high power switch tube constructed in accordance with our invention, FIG. 2 is a detailed view showing one stage of construction of the high power switch tube of FIG. 1, FIG. 3 is a view illustrating another stage of the production of the high power switch tube according to our invention, FIG. 4 is a schematic diagram illustrating one manner in which the high power switch tube according to our invention is utilized in an electronic circuit, FIG. 5 illustrates modified construction of the inner wall of the ceramic portion of the high power switch tube according to our invention, FIGS. 6 and 7 are detail views showing modified forms anode construction useful in the present invention, FIG. 8 is a detail view in section, showing a protective shield in position within a tube envelope, FIG. 9 is a vertical cross-sectional view of an alternative construction of a high power switch tube according to the invention, and FIG. 10 is a sectional view of an alternative anode structure useful in the device of FIG. 9.

As mentioned hereinbefore, the reason that electronic devices of the ignitron or similar type have been incapable of serving the purposes which are served by the devices of the present invention is that the hold-off and breakdown voltage of the devices are very low. The low hold-off and breakdown voltages of prior art ignitrons are due primarily, we have found, to the fact that many ionizable gaseous impurities are present within the components of the devices and within the mercury which constitutes the cathode thereof. In accord with the present invention therefore, high hold-off and breakdown voltages are attained by constructing the anodes thereof refractory materials such as titanium, zirconium, molybdenum, tungsten, thorium or alloys therebetween which may be processed at extremely high temperatures of at least 1000° C. to remove all occluded gases therefrom so that initially there are no ionizable gases present within the device. In addition to the foregoing, the mercury which is utilized to form the pool-type cathode of the devices of the invention is highly purified by distillation and distilled directly into the devices of the present invention in order to prevent the introduction of ionizable gaseous impurities thereinto through the agency of the mercury utilized. As a third feature utilized in the present invention in keeping interior of the devices thereof free of ionizable gases, we have found that any residual ionizable gaseous pressure may tend to build up in the devices of the invention during operation by the release of occluded or included gases, may be prevented by utilizing, as the anode of the devices of the invention, a material such as tungsten or molybdenum which, at the high current densities at which the devices of the invention are operated, is subjected to sputtering by virtue of positive ion bombardment, causing certain interior walls of the device to be continuously coated with a continuously growing layer of anode material. Positive ions of any ionizable gas which may be present within the devices of the invention are statistically attracted to the fresh surfaces and deposit thereupon. Subsequent deposits of the sputtered anode material upon the surfaces of the interior of the devices readily buries these ions and removes the gases from the interior of the devices so that the atmosphere therein may be maintained pure, thus facilitating the achievement of high hold-off and breakdown voltages.

Referring now more particularly to FIG. 1 of the drawings for a detailed description of the invention, 10 represents generally the entire switch tube of the ceramic embodiment of our invention having a tubular envelope 12 which may be of any suitable cross-sectional configuration but is herein described as being circular for matters of convenience. The envelope 12 may be of a suitable refractory ceramic such as the forsterite disclosed and claimed in copending application of A. G. Pincus, S.N. 546,215, filed November 10, 1955, and assigned to the assignee of this invention. Mounted at one end of the envelope 12 is an anode 14 preferably of titanium with a portion 16 of a truncated tear-drop shape fitting well within the end of the envelope 12 and being uniformly spaced from the envelope 12. A radially enlarged portion 18 of anode 14 has an annular shoulder 20 engageable with the conforming surface of the end of envelope 12 with a thin washer 22, preferably of nickel, iron or other suitable bonding material disposed therebetween. In a completed tube, the parts at the junction of the ceramic envelope 12 and annular shoulder 20 are fused or bonded to provide a sealing joint thereat. The inner end of anode 14 is concave or recessed at 24 and at the outer end of the anode is provided a threaded bore 26 for suitably engaging an external electrode-making contact with the anode. An undercut portion 27 of the anode provides an increased spacing from the inner wall of envelope 12 largely removing the support for droplets of mercury that may condense and form between the anode and envelope after use of the tube. Thus, the droplets will fall from this region when the tube is in position as shown in FIG. 1.

At the other end of the envelope 12, there is provided a cathode supporting member 28 having a reduced portion 30 fitting within the end of the ceramic body and a radially enlarged portion 31 forming an annular shoulder 32, engageable with the other end of the ceramic body. A washer 34 of nickel, iron or other suitable bonding material is disposed between the engageable surfaces. For facilitating external contact with the cathode supporting member 28, a reduced, externally threaded portion 36 integral with the main body of the cathode supporting member is provided, and for enabling communication with the interior of the tube, as is necessary during construction thereof, a small bore 38 is provided through the cathode supporting member and reduced portion 36 and through a nipple extension 40 thereof. In the finished embodiment of the tube a Fernico tubulation, pinched to form a sealing member 42, closes off the bore 38 at the end of the nipple 40.

The interior of the ceramic envelope 12 also contains a quantity of mercury 44 forming the effective cathode of the tube and for initiating ionization of the mercury, a conductive starter band 46 comprising a very thin conductive film of baked titanium hydride is applied about the ceramic body 12 near the cathode end thereof. For establishing external connections to band 46, another band 48 of material such as copper is external of, and in tight engagement with, film band 46. A tight seal is formed between shoulder 20 and one end of ceramic envelope 12 with washer 22 serving as a suitable alloying flux for this purpose and between shoulder 32 and the other end of ceramic envelope 12 with the washer 34 serving as a suitable alloying flux.

In the operation of tube 10, and during conduction of the very high currents under consideration, a certain amount of bombardment of the anode surface occurs. This bombardment of the anode results in sputtering of anode material from the bombarded surface of the anode. When the anode is fabricated from titanium, a material which sputters very readily, the amount of material sputtered is in excess of that which is necessary to maintain the purity of the mercury vapor within the devices of the invention by removing any ionizable gaseous impurity which may be released from the anode or from the mercury which constitutes the pool cathode of the device. To this extent, it is desirable to prevent the accumulation of too high a concentration of sputtered titanium upon the interior walls of ceramic envelope 12 to avoid short circuiting of anode and cathode. The curved configuration of anode surface 24 illustrated in FIG. 1 is sufficient to cause the amount of material sputtered from that surface which is deposited upon the interior walls of ceramic envelope 12 to be relatively low as compared with the amount of sputtered material which is directed along the axial direction of the tube and falls into mercury pool 44. Anode 14 is preferably fabricated from a metal having good gettering characteristics for noncondensible vapors such as titanium, zirconium, thorium or alloys thereof or therebetween.

In the construction of tube 10, the several parts hereinabove described with respect to FIG. 1 are assembled or stacked as shown in FIG. 2 of the drawing and mounted on a pedestal 49 disposed on a base support 50. The tube is enclosed in a bell jar 52 making sealed engagement with the base 50 by means of a sealing gasket 54 fitting in a recess 56 at the open end of the bell jar, the sealing gasket also making contact with base 50. An induction type heater having a coil 58 and a tubular refractory metal member 59 are disposed about the tube 10 within the bell jar 52 and electrical energy is supplied to the coil through a pair of leads 60 and 62 extending through base 50 and being insulated therefrom by suitable insulators 64 and 66 mounted in base 50. After the tube is mounted in bell jar 52 and the bell jar is sealed to base 50, the interior of the bell jar is evacuated by a vacuum pump 68 making communication with the interior of the bell jar through a conduit 70 extending through an aperture in base 50 and upon the completion of the evacuation procedure, the interior of the bell jar is filled with argon gas from a source 70 communicating with the interior of the bell jar through a conduit 72 extending through an aperture in base 50 and being controlled by a valve 74 interposed in the conduit line. Argon at a pressure approximately one atmosphere fills the region within the bell jar and thereafter heat is applied to tube 10 through the coil 58 and the entire tube is heated to a temperature of approximately 1050° C. until nickel or iron rings 22 and 34 alloy with the ceramic and titanium electrodes 14 and 28. This temperature is maintained for a period of a few minutes during which the alloying process is completed and at which time the tube is thoroughly outgassed rendering the seal free of malformation due to contaminating gases.

Upon the completion of the bonding of the anode and cathode supporting members to the ceramic body, the tube is disposed on a pedestal 76 as shown in FIG. 3 of the drawings. A Fernico tubulation 42 is sealed to the nipple 40 at the end of the tube and is sealed to a glass tube 80 with which it communicates. Branches 82 and 84 of the tube 80 extend, respectively, to a mercury ampoule 84 and to a vacuum pump 86. Ampoule 84 contains a predetermined quantity of mercury 87 and is mounted on a pedestal 88 supported on a base 90. The ampoule is sealed at a nipple 92 in a portion of a tube 82 and a resistive electrical heating coil 94 is disposed about the ampoule for the purpose of heating the mercury at a predetermined time. A magnetic slug 96 is slideable within a portion of a tube 82 into contact with sealed nipple 92 for the purpose of breaking the nipple under circumstances described hereinbelow. Slug 96 may be moved for this purpose by a magnet disposed in close proximity thereto and exterior to a tube 82. The entire distillation apparatus is disposed in an oven having a heating coil 97.

In the fabrication of tube 10, electrical energy is applied to the resistive coils of the oven, raising the temperature to about 400° C. Simultaneously, the tube is evacuated by the pump 86. This oven temperature is maintained for approximately two hours, after which the resistive coils are de-energized and the oven allowed to cool. This procedure is repeated, the tube heated and cooled until the tube is evacuated to a pressure of approximately $10^{-8}$ millimeters of mercury. Usually two such cycles achieve the desired results. For determining the tube pressure during construction, an ion gauge 98 is provided in communication with tube 84. After the pressure within the tube has been reduced to approximately $10^{-8}$ millimeters of mercury, nipple seal 92 within tube 82 is broken by dropping magnetic slug 96 on the same and the mercury within ampoule 84 is heated by heating coil 94, vaporizing the mercury which rises in tube 82. At a region where tube 82 joins the tubes 80 and 84, a blast of cold air is directed upon tube 82 whereby the vaporized mercury within the tube is condensed into droplets of mercury. The section of tubes 82 and 84 near the junction with tube 80 are curved downwardly as seen in FIG. 3 whereby the droplets of mercury formed in this region fall into tube 10 through tube 80. Thus, mercury 86 is distilled into tube 10 to assure high purity for optimum performance of tube 10. After completion of the distillation process hereinabove described, tube 10 is sealed by collapsing and resistance welding the end of Fernico tubulation 42 to provide a finished tube substantially shown in FIG. 1 of the drawing.

For an understanding of the function and operation of tube 10, reference is had to FIG. 4 of the drawing, as well as to FIG. 1, wherein 100 represents an electrical load through which it is necessary to pass a large current. The load is connected in series circuit relationship with a bank of capacitors represented at 102. Tube 10 is interposed in this series circuit with anode 14 connected to capacitor bank 102 and cathode support member 28 connected to the load to control the initiation of the flow of current from the capacitor bank to the load. Capacitor bank 102 may comprise any number of capacitors connected in parallel with each other to provide the requisite composite capacity to store sufficient charge to provide the load current required.

For charging the capacitors in bank 102, the output of a power supply 104 of any suitable type having an output potential sufficiently great to charge the capacitors is selectively applied to the capacitor bank through a current limiting resistor 106 under the control of a switch 108, which may be conventional. The period of time required to charge the capacitor bank by the power supply depends upon the power capabilities of the power supply and the capacity of bank 102 and under usual circumstances may be periods of time measured in minutes. After completion of charging, switch 108 is opened to prevent short circuiting of the power circuiting of the power supply.

During the charging period and after completion thereof the potential across capacitor bank 102 appears across tube 10. However, tube 10 "holds off" this potential and does not conduct. To establish conduction through the tube and the load, ionization of the mercury within tube 10 is initiated by the application of a suitable pulse between starter band 48 and cathode support member 28 of tube 10 the potential of the starter band being positive with respect to support 28. Such a pulse is derived from a pulse generator 112, coupled to starter band 48 and cathode support member 28 through a transformer 114. The primary winding 116 of the transformer is connected to the output of the pulse generator and a secondary winding 118 is connected at respective ends to band 48 and cathode support member 28. The pulse applied to primary winding 116 is negative as shown at 120 and through the phase inversion occurring in transformer 114, a positive pulse 122 is applied to the tube starter circuit. Such a pulse is effective to cause current conduction between the band and the mercury pool cathode within the tube which begins the ionization of mercury within the tube. In a very short interval of time such ionization causes conduction between the tube anode and cathode. Thus, the capacitor bank is effectively applied directly across load 100 since, in the ionized condition of the mercury within tube 10, the tube presents a very low impedance to current flow. The current in tube 10 maintains the ionization therein and tube 10 remains highly conductive until the capacitor bank is substantially discharged, at which time the potential across the bank and tube 10 drops to a low value and the mercury within tube 10 deionizes. The tube is then again conditioned for "holding off" the high potential of power supply 104 until a starting pulse is again applied.

In accordance with a physical embodiment of tube 10, and as a feature of our invention, the tube is of relatively small axial dimensions whereby the distributed inductance imposed by the same on the high frequency current pulses flowing through the tube, is maintained at a minimum. For conduction of 35,000 amperes to 70,000 amperes, the body 12 need be only approximately 3 inches long, anode portion 16 approximately 1¼ inches in axial dimension, cathode supporting member 28 approximately ⅜ inch in axial dimension and mercury pool cathode 44 approximately ¼ inch deep.

It is to be noted that as another feature of our invention, in this embodiment of the present tube, the starter band is not at all subject to any destructive influences during high current flow through the tube. In an application such as this where the repetition is low, for example, one per minute, the externally located starter band has an unlimited life and is further completely effective in its function.

As another feature of this embodiment of our invention, the insulating ceramic body of the tube is effective in usual situations involving conduction of current of approximately 35,000 amperes, to maintain the arc between the anode and mercury pool cathode and to prevent the arc from extending from the anode to the inner tube wall as occurs in conductive wall ignitrons. However, in response to passage of extremely large currents of the order of 70,000 amperes through the tube 10, a conductive deposit of presently unknown origin but believed to be either sputtered anode material or chemically reduced surface portions of the ceramic envelope 12 may form on the inner wall of the envelope 12, rendering the tube inoperative by reason of a short circuit being thereby established between the anode and cathode. To maintain insulation between the anode and cahode under these circumstances, according to still another feature of our invention, the inner wall of envelope 12 may be formed with a number of irregularities along its length as shown in FIG. 5 to provide portions along which no conductive deposit is formed. Such irregularities may be of various configurations, as for example, the annular grooves of rectangular cross-section as shown at 124 and 126, annular ridges of triangular cross-section as shown at 128, 130 and 132, annular grooves of semi-circular or segmental cross-section as shown at 134, 136 and 138 or as the rectangular grooves 140 and 142 axially enlarged at an outer radius thereof. In each of these constructions, the conductive deposit fails to coat the radial extreme portions of the envelope along the irregularities and the conductive path between anode and cathode along the inner envelope wall, is interrupted. Thus, the tube remains operative notwithstanding the deposit mentioned.

According to a feature of another embodiment of our invention shown in FIG. 6, non-condensible vapors which lower breakdown voltage are kept out of tube 10 by forming the inner anode portion 144 of tube 10 of titanium, zirconium, thorium or alloys thereof or therebetween. Anode 144 has a generally right circular, cylindrical shape with an insert 146 predominantly forming the inner face thereof. The insert 146 which is preferably a relatively thin wafer, is made of a suitable refractory metal such as molybdenum of tungsten and is provided with exterior threads for engaging threads in a shallow recess in the main body of the anode. Under these circumstances, the anode face is flat rather than concave, since the highly refractory metals used as inserts are not as subject to deterioration by sputtering with the consequent scattering of metal as in the case of a titanium anode.

According to still another embodiment of our invention as shown in FIG. 7 of the drawings, the anode may be of a metal or alloy of the titanium group and generally of truncated tear drop shape as at 148 with an enlarged insert 150 externally threaded to engage an interiorly threaded recess in the anode face. According to another feature of our invention, the insert may be an alloy of titanium and a refractory metal such as molybdenum or tungsten and under these circumstances the effect of the small amount of sputtering that may occur at the anode is minimized by the concave face 152 of the insert serving to minimize laterally sputtered metal.

As another illustration of a function or use of tube 10, it frequently occurs that for certain purposes, the capacitors of bank 102 are subdivided into groups and that when discharged, it is necessary to connect these groups in parallel or in some instances to obtain the desired potential, certain groups are connected in series relation. Tube 10 is admirably suited for performing this function merely by being interposed in the circuit in question and being controllably triggered for controlled switch closure. In such circumstances, it is frequently important to close the several switches in the circuit at substantially the same instant of time or at least within a very short interval, and the present tube being capable of firing several tubes with a period of less than one tenth of a microsecond accomplishes desired results in this function.

According to still another feature of our invention, the insulating qualities of the interior surface of the ceramic envelope 12 may be maintained notwithstanding very high currents of the order of 70,000 amperes by the provision of a shield 154 shown in FIG. 8 of the drawings and disposed within the ceramic envelope 12. The shield is generally of a tubular configuration extending along a portion of the length of the envelope and to secure the shield in position, an annular flange 156 is formed intermediate to the ends of the shield which flange may be fitted in an annular groove 158 in the interior wall of the envelope 12. For facilitating insertion of the shield 154, it is axially split at 160 so as to allow diametral reduction of the shield by slight squeezing wherein the edges at the split 160 overlap. In such reduced condition the flange 156 can be inserted within the envelope walls and when the groove 158 and flange 156 are in radial alignment the shield, due to its resiliency expands to the position wherein the edges at split 160 abut. For withstanding the heat produced within the tube, the shield is preferably formed of a refractory material such as molybdenum and is also made resilient to be deformable sufficiently to be slipped through the envelope from an end thereof to the position shown in FIG. 8. Thus, the shield protects the inner wall surface of the envelope from the intense heat of the arc within the tube during high conduction. The protected surface accordingly remains free of conductive deposit which may otherwise be formed. In FIG. 9 of the invention there is illustrated, in vertical cross-section, an alternative body of the device illustrated in FIG. 1. While the device illustrated in FIG. 1 is of the ceramic-metal variety and vacuum-tight seals are obtained by fusion between the ceramic and the metal, the device of FIG. 9 is more of the conventional construction for ignitrons and includes conventional glass-metallic seals. Although the device of FIG. 1 is advantageous in that the construction is relatively simple, the device of FIG. 9 has the advantage of incorporating the most important advantages of the present invention but nevertheless being capable of fabrication utilizing conventional ignitron assembling equipment and methods. In FIG. 9, the ignitron includes a generally cylindrical ferrous metallic body member 202 having therein an anode member 204 and a pool-type cathode 206. The anode end of cylindrical member 202 is partially closed with a header 208 which may conveniently be of stainless steel welded or otherwise conventionally fastened to the interior of one end of cylindrical member 202. The cathode end of cylindrical member 202 is substantially closed by header 210 which may also conveniently be of stainless steel. An annular flange member 212 is welded or otherwise conventionally fastened to header 208 and presents an upwardly extending collar 213. This member is conveniently made of Fernico and is adapted to be connected with a glass sealing cylindrical member 214 which also seals, at its upper end, to a bushing member 216 which may also conveniently be of Fernico. An anode support rod 218 passes through bushing member 216 and is fastened thereto by welding, soldering or other conventional method so as to form a vacuum-type seal. Anode support member 208 is threaded at 220 at its upper end to facilitate connection to a line member and is threaded at 222 at its lower end to facilitate connection to anode member 204. Anode member 204, in accord with the present invention, is fabricated of a high temperature refractory material, such as molybdenum, tungsten or any other refractory metal which is capable of sustaining high bakeout temperature and of being made substantially gas-free and is also capable of sputtering a sufficient amount of material from the surface thereof to clean up any accumulation of residual gases which may tend to build up within the device during the operation thereof. A flange and collar member 224 conveniently made of Fernico is soldered, welded or otherwise conventionally fastened to a circular hole set off center in header 210 at the cathode end of the cylindrical container 202. A cylindrical glass sealing member 226 is sealed in vacuum-type seal thereto and to a Fernico bushing member 228. An igniter connecting member 230 passes axially through flange member 224 and is sealed to and passes through bushing member 228. At its interior end ignitor connection member 230 supports an ignitor support member 232 to which an ignitor 234, conveniently fabricated of boron carbide, is fastened so as to extend downwardly over a portion of its sharpened tip 236 into the surface of mercury pool 206. The ignitor tip is placed adjacent to cylinder wall 202 to avoid the main arc stream during conduction, both to preserve the ignitor, maintain gas purity (since boron carbide does not outgas well) and to avoid excess sputtering. Mercury pool 206 is comprised of highly purified mercury obtained by distillation and is deposited in the device in a manner substantially as illustrated in FIG. 3 of the drawings for the device of FIG. 1.

Although the device of FIG. 9 does not have the metal and ceramic construction of the device of FIG. 1, it may nevertheless be heated to high outgassing temperatures limited ony by the melting point of the glass seals 214 and 226. This temperature may be as high as 500° C. By properly shielding seals 214 and 226 during bakeout, the center portion of the tube can be raised to 900° C. The presence of the highly purified mercury within the device of FIG. 9 and the refractory anode, which is preferably of molybdenum, is sufficient to obtain high hold-off and breakdown voltages for this device similar to the high voltages obtained by the devices of FIG. 1. This is because the anode and cathode are respectively of highly purified molybdenum and highly purified mercury so that very little residual gas is introduced into the device after evacuation. Additionally, whatever residual gas which is introduced into the device during operation may readily be removed by sputtering of molybdenum from the anode to the side walls of cylindrical member 202 and the subsequent deposition thereupon of gaseous ions which are subsequently covered by further deposition of sputtered material.

Since, in the device of FIG. 9, the only portion of the anode which is actually subjected to the high temperatures of the arc which may result in the freeing of occluded or adsorbed gases, is the surface adjacent region thereof, it is not necessary that the entire anode be constructed of the refractory material preferably molybdenum. In FIG. 10 of the drawing, there is shown, in vertical cross-section, an alternative construction for anode 222 of FIG. 9, wherein the anode is composed of a main body 238, which may for example, be of soft steel upon which there is deposited or plated a surface adjacent region 240 of a high melting point refractory material which has sufficient sputtering characteristics such as molybdenum or tungsten. This coating may be applied by fabricating the refractory material into a cup and press fitting the core thereinto, or equivalent metal-working process.

An indication of the great utility and value of devices constructed in accord with the present invention, as compared with prior art ignitrons, may readily be obtained from the following comparison. Devices of the prior art constructed substantially as illustrated in FIG. 9 of the drawing, but utilizing a carbon anode and an unpurified mercury cathode are generally unable to hold off voltages in excess of 20,000 volts on the first switching operation. After only several switching operations, these devices are generally unable to hold off voltages in excess of from 2 to 5,000 volts. As compared with the foregoing, substantially identical ignitron devices constructed in accord with the present invention, but utilizing molybdenum anodes and the highly purified mercury pool cathode material have been operative on the first switching operation to hold off a voltage of 40,000 volts, and, after 7,000 switching operations did not fail when they were subjected to hold-off voltages of 20,000 volts.

While the present invention has been described by reference to particular embodiments thereof, it will be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. An apparatus comprising a ceramic envelope having a gas-free refractory metal anode with a portion of said envelope in sealing engagement with one end thereof, another portion of said anode projecting within said envelope and having a concave face exposed to the interior thereof, a gas-free cathode supporting member having a portion in sealing engagement with the other end of said envelope to provide a confined region within said envelope, a mercury pool cathode within said envelope and a conductive band about the exterior of said envelope in proximity to said cathode supporting member and means for applying a high potential, high power source between said cathode supporting member and anode and means for establishing conduction between said anode and cathode and comprising a potential source applied between said conductive band and said cathode for initiating ionization of said mercury in said region.

2. An apparatus comprising a ceramic envelope having a gas-free titanium anode with a portion in sealing abutment with one end of said envelope, another portion of said anode projecting within said envelope and having a concave face exposed to the interior thereof, a titanium cathode supporting member having a portion in sealing engagement with the other end of said envelope, a gas-free mercury pool cathode within said envelope and a conductive band about the interior of said envelope in proximity to said cathode supporting member, means for applying a high power high potential source between said cathode and said anode and means for establishing electrical conduction between said conductive band and said cathode to initiate conduction of high current between said anode and said cathode.

3. An apparatus comprising a ceramic envelope having a gas-free refractory metal anode with a portion in sealing engagement with one end of said envelope, another portion of said anode projecting within said envelope and having a concave face exposed to the interior thereof, a gas-free mercury pool cathode disposed within said envelope and a conductive band about the exterior of said envelope in proximity to said cathode, the interior wall of said envelope having a plurality of annular ridges and depressions in alternate order along its length.

4. An apparatus comprising a refractory ceramic envelope having a gas-free titanium anode with a portion extending within one end of said envelope, a refractory metal insert forming predominantly the inner surface extremity of said anode, a cathode supporting member having a portion in sealing engagement with the other end of said envelope, a gas-free mercury pool disposed within said envelope and supported by said cathode supporting member and a conductive band about the exterior of said envelope in proximity to said cathode supporting member.

5. An apparatus comprising a refractory ceramic envelope having a refractory-metal anode extending within one end thereof, a mercury pool cathode disposed within said envelope supported by said cathode supporting member; the interior of said envelope being evacuated and substantially free of occluded gases, and a conductive starter band about the exterior of said envelope in proximity to said cathode.

6. An apparatus comprising a refractory ceramic envelope having a gas-free refractory metal anode extending within one end thereof, a gas-free mercury pool cathode extending within the other end of said envelope and being spaced from said anode and a shield having portions spaced from the wall of said envelope and extending along a portion of the interior of said envelope.

7. An electric discharge device comprising an evacuable envelope; an anode electrode including an arcing surface within said envelope, said arcing surface being composed of a high temperature refractory metal having good sputtering characteristics and being substantially free of all sorbed gases; a pool-type cathode supported within said envelope and comprising a pool of highly purified vacuum-distilled mercury; and a starter electrode in close juxtaposition to said cathode for initiating an arc discharge within said envelope by causing localized evaporation and ionization of at least a portion of said mercury pool.

8. An electric discharge device comprising an evacuable envelope; an anode electrode including an arcing surface within said envelope, said arcing surface being substantially free of all sorbed gases and comprising a material selected from the group consisting of titanium, zirconium, molybdenum, tantalum, tungsten, thorium, and alloys therebetween; a pool-type cathode supported within said envelope and comprising a pool of highly purified vacuum-distilled mercury; and a starter electrode in close juxtaposition to said cathode for initiaitng an arc discharge within said device by causing localized evaporation and ionization of at least a portion of said mercury pool.

9. An electric discharge device comprising a metallic hollow evacuable envelope containing a pool-type cathode, said pool-type cathode being comprised of high purity vacuum distilled mercury; a metallic anode, said anode including an arcing surface comprising a high temperature refractory metal having good sputtering characteristics and being capable of high temperature processing prior to fabrication to remove all gases therefrom at a temperature in excess 1000° C.; and an ignitor electrode partially submerged below the surface of said pool-type cathode, said ignitor being disposed adjacent the wall of said evacuable envelope so as to be removed from the central portion of said pool-type cathode to preclude said ignitor being exposed to a high current arc between said cathode and anode.

10. An electric discharge device comprising an evacuable metallic cylindrical envelope; an anode disposed at one end of said cylindrical envelope and insulated therefrom, said anode including an arcing surface comprising a gas-free material selected from the group consisting of titanium, zirconium, molybednum, tungsten, tantalum, thorium and alloys therebetween; a gas-free pool-type cathode disposed at the opposite end of said cylindrical envelope and comprising a high purity vacuum distilled pool of mercury; and an ignitor electrode suspended within the cathode end of said envelope and extending downwardly into the surface of said cathode and insulated from said cathode and from said evacuable envelope, said ignitor electrode being located immediately adjacent the interior wall of said cylindrical envelope so as to be removed from the center portion of said cathode to preclude its being exposed to a high current arc established between said anode and said cathode.

References Cited in the file of this patent

UNITED STATES PATENTS

| | | |
|---|---|---|
| 2,354,031 | La Forge | July 18, 1944 |
| 2,605,441 | Lewin | July 29, 1952 |
| 2,624,010 | Chamberlain et al. | Dec. 30, 1952 |
| 2,651,737 | Marshall | Sept. 8, 1953 |
| 2,727,174 | Bruijning | Dec. 13, 1955 |
| 2,824,254 | White | Feb. 18, 1958 |
| 2,877,367 | Vang | Mar. 10, 1959 |